United States Patent [19]
Ando et al.

[11] Patent Number: 5,268,985
[45] Date of Patent: Dec. 7, 1993

[54] LIGHT-GUIDING DEVICE HAVING A HOLOGRAM LAYER

[75] Inventors: Hirosi Ando, Nishikasugai; Namba Shinji, Kariya, both of Japan

[73] Assignee: Nippondenso Co., Ltd., Kariya, Japan

[21] Appl. No.: 921,801

[22] Filed: Jul. 30, 1992

[30] Foreign Application Priority Data

Jul. 30, 1991 [JP] Japan ................................. 3-189932
Jun. 19, 1992 [JP] Japan ................................. 4-160703

[51] Int. Cl.⁵ .............................................. G02B 6/10
[52] U.S. Cl. ..................................... 385/129; 385/14; 385/37; 359/34
[58] Field of Search .................... 385/14, 12, 37, 129, 385/130, 131, 132; 359/34, 485; 250/227.24, 227.26, 227.28

[56] References Cited

U.S. PATENT DOCUMENTS

| | | | |
|---|---|---|---|
| 4,662,711 | 5/1987 | Tada et al. | 385/129 |
| 4,866,694 | 9/1989 | Korth | 369/110 |
| 5,082,339 | 1/1992 | Linnebach | 385/14 |

FOREIGN PATENT DOCUMENTS

62-119685 11/1985 Japan .

OTHER PUBLICATIONS

"Edge-Lit Rainbow Holograms" by Stephen A. Benton et al; SPIE, vol. 1212 Practical Holography IV(1990); Jan. 18, 1990; pp. 149-157.

*Primary Examiner*—Frank Gonzalez
*Attorney, Agent, or Firm*—Cushman, Darby & Cushman

[57] ABSTRACT

A light-guiding device having a light-incident surface and a light-outgoing surface for guiding light incident from the light-incident surface from the light-outgoing surface toward a light-receiving surface of a photodetector for generating an electric signal corresponding to a quantity of the received light. The device comprises a hologram layer having an interference pattern which acts as a diffraction grating to diffract and reflect the light, incident from the light-incident surface, in a predetermined direction. The hologram layer is interposed between first and second total reflection layers. The first total reflection layer has a first total reflection surface disposed in opposed relation to one of the longitudinal surfaces of the hologram layer so that the light diffracted and reflected by the hologram layer is incident on the first total reflection surface at a predetermined angle larger than the critical angle so as to be total-reflected thereon, and the second total reflection layer has a second total reflection surface disposed in opposed relation to the other longitudinal surface of the hologram layer so that the incident light passing through the hologram layer is incident on the second total reflection surface at a predetermined angle greater than the critical angle so as to be total-reflected thereon. This arrangement improves the light-receiving performance concurrently with reducing the thickness of the device.

20 Claims, 6 Drawing Sheets

LIGHT-GUIDING DEVICE HAVING A HOLOGRAM LAYER

BACKGROUND OF THE INVENTION

The present invention relates to a light-guiding device, and is applicable particularly, but not exclusively, to a light-receiving apparatus of a laser radar system for measuring the distance between motor vehicles.

Conventionally, as light-guiding devices for measurements and the like, there are known a lens system comprising a convex lens 100, having a focal length f, and a light-receiving element 101 as illustrated in FIG. 10A and a concave mirror system comprising a concave mirror 105, having a focal length f, and a light-receiving element 106 as illustrated in FIG. 10B. The former is arranged such that light condensed through the convex lens 100 is received by the light-receiving element 101 and the later is arranged such that light condensed through the concave mirror 105 is received by the light-receiving element 106. Further, as a light-guiding device to be used for a laser radar system of a motor vehicle, there is known a device comprising a semiconductor laser element for emitting laser light through a light-transmitting/receiving system convex lens toward an object and a reflecting plate having a reflecting surface to reflect the laser light emitted therefrom or the laser light reflected from the object as disclosed in the Japanese Utility Model No. 3-14478.

In the aforementioned conventional light-guiding devices, because of having to guide light through the convex lens 100 or the concave mirror 106, a space is required between the convex lens/concave mirror and the light receiving element 101/106 which corresponds to the focal length f light transmitting/receiving system. Hence, there is a problem that the device is required to be enlarged in size in the thickness direction. This problem is also presented in the light-guiding device as disclosed in the Japanese Utility Model No. 3-14478. One possible solution of this problem is to use a convex lens 100 having a shorter focal length as compared with the aperture. However, difficulty is encountered to effectively condense light because of large affection of the aberration.

SUMMARY OF THE INVENTION

It is therefore an object of the present invention to provide a light-guiding total internal reflection device which is constructed so as to reduce the thickness of the light transmitting/receiving system.

According to this invention there is provided a light-guiding device having a light-incident surface and a light-outgoing surface for guiding light incident from the light-incident surface from the light-outgoing surface toward a light-receiving surface of photoelectric converting means for generating an electric signal corresponding to a quantity of the received light. The device comprising a hologram layer having an interference pattern which acts as a diffraction grating to diffract and reflect the light, incident from the light-incident surface, in a predetermined direction. The hologram layer is interposed between first and second total reflection layers, the first total reflection layer having a first total reflection surface disposed in opposed relation to one of the longitudinal surfaces of the hologram layer so that the light diffracted and reflected by the hologram layer is incident on the first total reflection surface at a predetermined angle so as to be total-reflected thereon, and the second total reflection layer having a second total reflection surface disposed in opposed relation to the other longitudinal surface of the hologram layer so that the incident light passing through the hologram layer is incident on the second total reflection surface at a predetermined angle so as to be total-reflected thereon.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
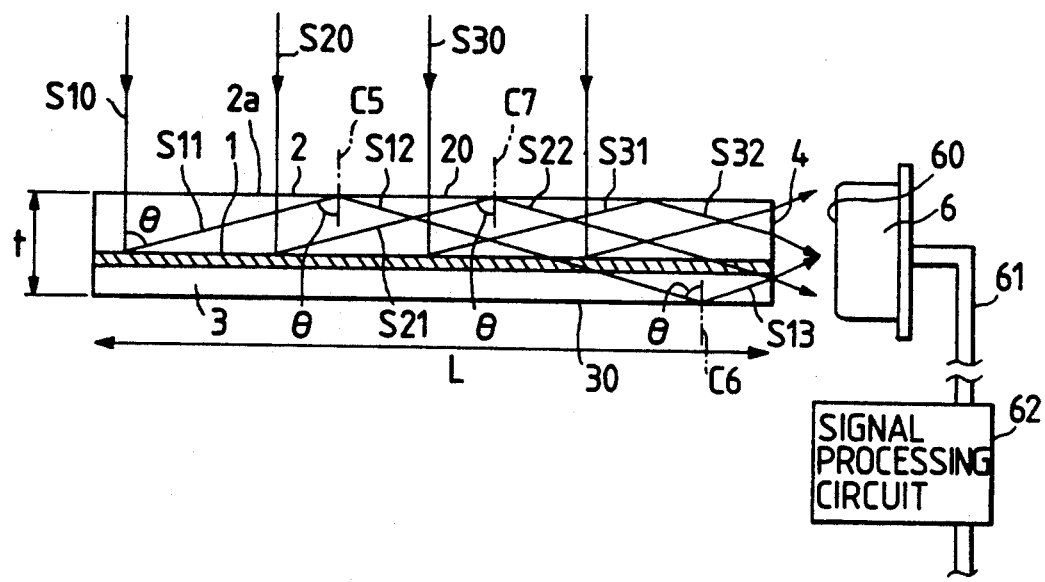
FIG. 1 is a side view showing an arrangement of a light-guiding device according to a first embodiment of this invention.

A first embodiment of this invention will be described hereinbelow with reference to FIGS. 1 to 4. This first embodiment is applied to a light-receiving apparatus having a function to receive light. In FIG. 1, a light-guiding device according to the first embodiment comprises a hologram layer 1, a substrate 2 (base) which is made of a glass or made of a resin such as poly methyl methacrylate and which acts as a total reflection layer, and a cover 3 which is made of a glass and which acts as a total reflection layer. The hologram layer 1 is formed on one surface of the substrate 2 in accordance with a method of application, and the cover 3 is at its one surface adhered to the other surface of the hologram layer 1 through an adhesive or binding material. That is, the hologram layer 1, the substrate 2 and the cover 3 are integrally combined with each other through the adhesive material, thereby constructing the light-guiding device according to this first embodiment. The other surface of the substrate 2 acts as a light-incident surface 2a (the upper surface of the substrate 2 in FIG. 1). Further, the upper surface of the substrate also acts as a total reflection surface 20 so that light incident and diffracted on the hologram layer 1 is total-reflected on the upper surface (light-incident surface 2a) of the substrate 2. On the other hand, the lower surface (the other surface) of the cover 3 acts as a total reflection surface 30 so that light passing though the hologram 1 is total-reflected on the lower surface of the cover 3. In this light-guiding device, one end surface (face) comprising one end surfaces of the substrate 2 and the cover 3 in their longitudinal directions acts as a light outgoing surface 4.

Here, this light-guiding device is arranged such that the hologram layer 1 has an index of refraction n of about 1.55, the substrate 2 has an index of refraction n of 1.52 and the cover 3 has an index of refraction n of 1.52. Further, the adhesive material is of a type having an index of refraction close to the indexes n of reflection of the hologram layer 1, substrate 2 and the cover 3. In detail, as the adhesive material there is used an ultraviolet hardened type optical adhesive material (NOA-61 manufactured by Norland Co., Ltd.).

The hologram layer 1 is principally made of gelatin dichromate having an excellent light transmissibility and a high resolution. On the hologram layer 1 there is entirely formed an interference pattern (interference fringes) which acts as a diffraction grating to change the optical path with light having a specific wavelength (880 nm), i.e., infrared radiation, incident thereon through the light-incident surface 2a of the light-guiding device (the upper surface of the substrate 2) in a substantially vertical direction being diffracted by an angle $\theta$ and reflected to advance in a specific direction. The angle of the interference pattern with respect to the hologram layer 1 surface is $\alpha$. Here, in this embodiment the angle $\theta$ is set to 41.2 to 138.8 degrees. Further, generally, the separation of the interference fringes of the hologram layer 1 is $\mu$m order, for example, 0.1 to 2 $\mu$m. The diffracting and reflecting characteristic of the interference pattern of the hologram layer 1 is basically affected by the wavelength of the light incident on the hologram layer 1. The hologram layer 1 diffraction-reflects only the light having a specific wavelength by a predetermined angle in a predetermined direction, while the predetermined angle is required to be set to a value whereby the light diffraction-reflected on the hologram layer 1 is incident on the total reflection surface at an angle exceeding the critical angle (the minimum incidence angle which allows the total reflection at the boundary surface between two materials having different refractive indexes). The light is generally infrared, visible light or it may be ultraviolet in some cases. It is also appropriate that it is laser light having an excellent coherent characteristic or non-coherent light such as solar light and artificial light.

In addition, the hologram layer 1 is generally made of a sensitive material for holograms. Because the separation of the interference fringes is $\mu$m order (for example, 0.1 to 2 $\mu$m), as the hologram sensitive material there is used silver halide or gelatin dichromate. In some cases, it is also appropriate to use a different material such as photopolymer and photoresist. In the case of using gelatin dichromate, generally gelatin is applied onto a substrate and immersed in ammonium dichromate solution, and then dried in a dark place, thereafter generating variation of index of refraction corresponding to a light intensity distribution of the interference pattern by means of an exposure system to thereby record the interference on the gelatin dichromate. Similarly, in the case of using silver halide or photopolymer, the interference pattern is recorded as the variation of index of refraction corresponding to the light intensity distribution of the interference pattern.

Figure 3:
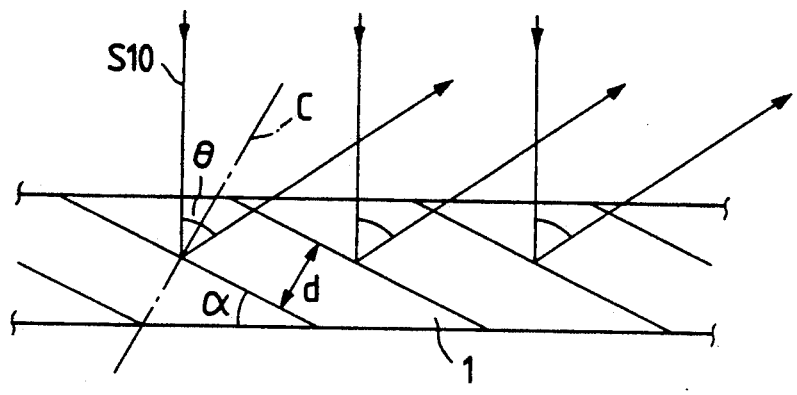
FIG. 3 is an illustration for describing the diffraction and reflection of light in a hologram layer in the first embodiment.

FIG. 3 shows the diffraction and reflection due to the hologram layer 1. As illustrated in FIG. 3, in the case that light with a wavelength $\lambda$ which advances along an optical path S10 perpendicular to the surface of the hologram layer 1 is diffracted by an angle $\theta$ and reflected on the hologram layer 1, the incidence of the light is arranged so as to make an incident angle $(\theta/2)$ with respect to the normal line C of the interference fringes. Thus, when the light is incident along the optical path S10, the angle $\alpha$ of the interference fringes becomes $(\theta/2)$. Further, when satisfying the relation of $2d \cdot \cos(\theta/2) = \lambda$ where d is the pitch of the interference fringes of the hologram layer 1, the incident light having the wavelength $\lambda$ is effectively diffracted and reflected on the hologram layer 1. Thus, it is preferable that the wavelength $\lambda$ of the light, the pitch d of the interference fringes and the angle $\theta$ are determined so as to satisfy the aforementioned relation.

Figure 4:
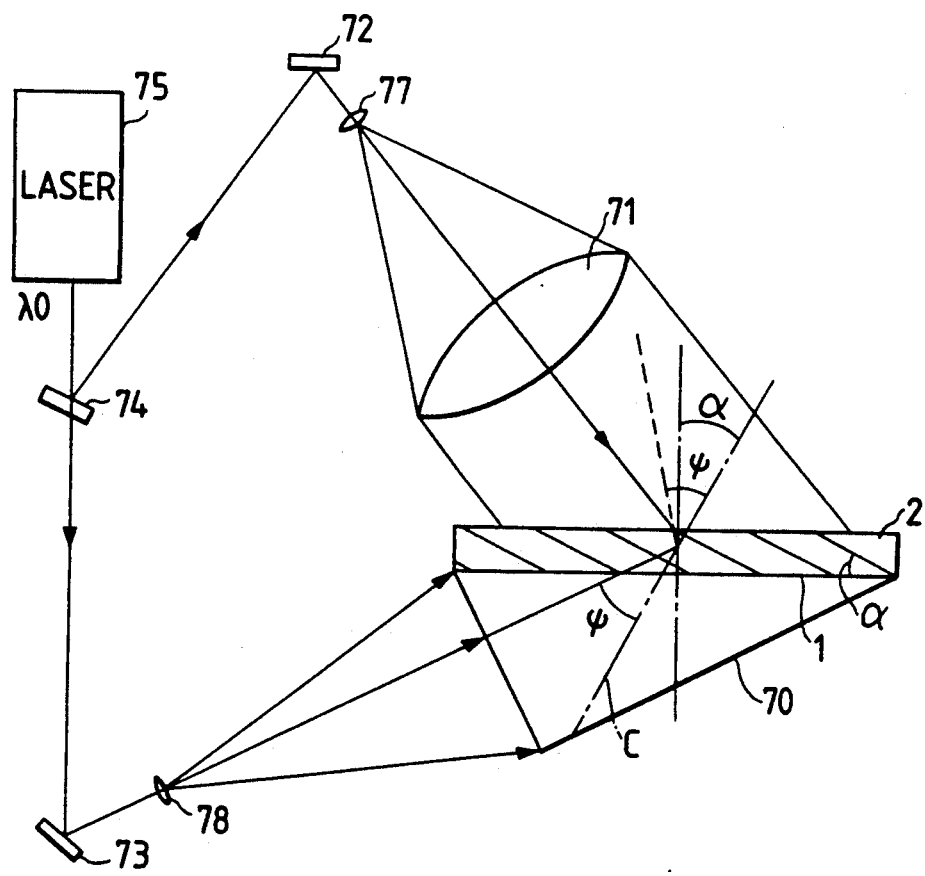
FIG. 4 is an illustration of an exposure optical system for forming an interference pattern on the hologram layer.

FIG. 4 shows one example that the hologram layer 1 having the interference fringes whose angle is $\alpha$ is produced by means of laser light having the wavelength $\lambda$o. As illustrated in FIG. 4, a prism 70 is attached to a substrate 2 on which a hologram sensitive material constituting the hologram layer 1 is applied. Further, there is used a convex lens 71, mirrors 72, 73, a half mirror 74, a laser element 75 (in detail, argon laser having a wavelength of 514 nm or krypton laser having a wavelength of 647 nm), and objective lenses 77, 78. A portion of the coherent laser light from the laser element 75 is reflected by the half mirror 74 so as to be incident through the mirror 72, objective lens 77 and convex lens 71 on the hologram sensitive material on the substrate 2, and on the other hand, the other portion of the laser light from the laser element 75 passes through the half mirror 74 so as to reach the hologram sensitive material on the substrate 2 through the mirror 73, objective lens 78 and prism 70, thereby exposing the hologram sensitive material for a predetermined time period to image interference fringes. Each of the interference fringes has an arc-configuration as indicated by dotted lines in FIG. 2. In this case, the relation between the incident angle $\phi$ of the light with respect to the normal line C of the interference fringes in FIG. 4 and the diffracting angle $\theta$ is arranged to be $\{\lambda o/\cos\phi\} = \{\lambda/\cos(\theta/2)\}$ where $\lambda$ represents the wavelength of the light incident on the hologram layer 1 having the interference pattern.

Here, after imaging the interference fringes, the imaged interference fringes are developed to record an interference pattern with a refractive index distribution by utilizing the swelling and shrinkage effect of the gelatin dichromate due to the exposure, thereby obtaining the hologram layer 1.

Figure 2:
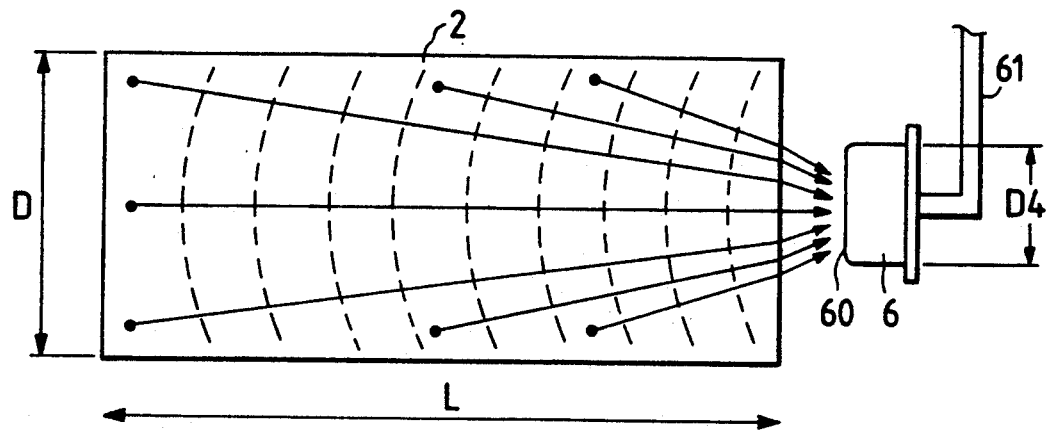
FIG. 2 is a top plan view showing the light-guiding device according to the first embodiment.

As illustrated in FIGS. 1 and 2, the length of the light-guiding device of this embodiment is indicated by L, the thickness thereof is indicated by t, and the width thereof is indicated by D. The length L is 140 mm, the width D is 40 mm, and the thickness of the hologram layer 1 is extremely thin as about 30 to 100 $\mu$m. Further, the thickness of the substrate 2 is about 2 mm and the thickness of the cover 3 is approximately 3 mm. Accordingly, although the length of the light-guiding device according to this embodiment is long and the width thereof is wide to enlarge the light-receiving area, the thickness t thereof is as thin as about 3 mm. Moreover, it is allowed that the substrate 2 is disposed in opposed relation to at least one surface of the hologram layer 1 or two substrates 2 are disposed in opposed relation to both the surfaces of the hologram layer 1. In the case that the two substrates 2 are disposed in opposed relation to both the surfaces of the hologram layer 1 to sandwich the hologram layer 1, it is possible to reinforce the hologram layer 1 and improve the moisture resistance so as to lengthen the life of the hologram layer 1. In addition, in order to reduce the light reflection and refraction as much as possible, it is preferable that the substrate 2 is closely brought into contact with the hologram layer 1. For the substrate 2 being closely brought into contact therewith, it is preferable to adhere the hologram layer 1 to the substrate 2 through an adhesive layer, apply to the substrate 2 the sensitive material constituting the hologram layer 1, and physically paste the hologram layer 1 on the substrate 2. For avoiding the light refraction due to the adhesive layer, the index of refraction of the adhesive material constituting the adhesive layer is preferable to be equal to or close to the index of refraction of the hologram layer 1 or the substrate 2. Further, in order to reduce the reflection and refraction at the boundary surface between the substrate 2 and the hologram layer 1, the refractive indexes of refraction of the substrate 2 and the hologram layer 1 are preferable to be equal to or close to each other. In addition, although for keeping the optical conductivity the light transmittance of the substrate 2 is preferable to be high, in the case that the length of the light-guiding path is short or in the case that the light-receiving amount is little, it is allowed that the transmittance is not necessarily high. Moreover, in this embodiment, as illustrated in FIG. 1, a light-receiving device 6 having a light-receiving surface 60 is disposed to be close to the light outgoing surface 4 and to be in opposed relation thereto. In detail, the light-receiving device 6 is constructed with a photodiode. A signal from the light-receiving device 6 is supplied through a signal line 61 to a signal processing circuit 62.

In operation, the light incident on the light-incident surface 2a of the substrate 2 in a substantially perpendicular direction to the light-incident surface 2a passes through the substrate 2 and is then incident on the hologram layer 1, whereby light having a specific wavelength is diffracted and reflected by the interference pattern of the hologram layer 1 to be directed at the angle θ toward the substrate 2 side. This diffracted light is incident on the total reflection surface 20 of the substrate 2 at an incident angle larger than the critical angle, and hence, reflected on the total reflection surface 20 of the substrate 2. On the other hand, the light passing though the hologram layer 1 is incident on the total reflection surface 30 of the cover 3 at an incident angle larger than the critical angle, thereby reflecting on the total reflection surface 30 of the cover 3. Thus, the light incident on the hologram layer 1 is outputted from the light outgoing surface 4 so as to be received by the light-receiving element 6. The output signal of the light-receiving element 6 is supplied to the signal processing circuit 62 which in turn detects the light reception. Here, the light not having the specific wavelength is not diffracted by the interference pattern of the hologram layer 1.

A detailed description will be made hereinbelow with reference to FIG. 1. In FIG. 1, the light advancing along the optical path S10 is diffracted and reflected at the angle θ on the hologram layer 1 so as to pass through an optical path S11. The light passing through the optical path S11 is incident on the total reflection surface 20 of the substrate 2 at the angle θ with respect to an normal line C5 of the total reflection surface 20. Here, since as described above the angle θ is set to 41.2 to 138.5 degrees larger than the critical angle, the light passing through the optical path S11 is total-reflected on the total reflection surface 20 so as to advance along an optical path S12. The light advancing along the optical path S12 directly passes through the hologram layer 1 because of not satisfying the diffracting and reflecting relation to the hologram layer 1. Further, the light passing though the hologram layer and advancing along the optical path S12 is incident on the total reflection surface 30 of the cover 3 at the angle θ with respect to a normal line C6 of the total reflection surface 30. Accordingly, the light advancing along the optical path S12 is total-reflected on the total reflection surface 30 of the cover 3 so as to advance along an optical path S13 to be outputted from the light outgoing surface 4 and received by the light-receiving element 6.

On the other hand, the light incident along an optical path S20 is diffracted by the angle θ and reflected so as to advance along an optical path S21. The light advancing along the optical path S21 is incident on the total reflection surface 20 of the substrate 2 at the angle θ with respect to a normal line C7 of the total reflection surface 20. Here, since the angle θ is an angle larger than the critical angle, the light advancing along the optical path S21 is similarly total-reflected on the total reflection surface 20 of the substrate 2 to advance along an optical path S22. The light advancing along the optical path S22 directly passes through the hologram layer 1 and advance through the light-outgoing surface 4 toward the light-receiving element 6 because of not satisfying the diffracting and reflecting relation to the hologram layer 1. Further, the light incident along an optical path S30 is similarly diffracted by the angle θ and reflected so as to advance along an optical path S31 and then reflected on the total reflection surface 20 of the substrate 2 to advance along an optical path S32 to be outputted from the light-outgoing surface 4.

Figure 10A:
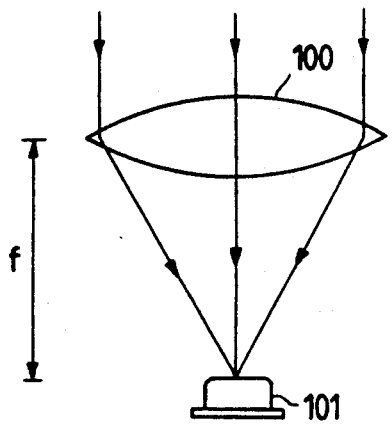
FIG. 10A is an illustration for describing a conventional light-guiding device.
Figure 10B:
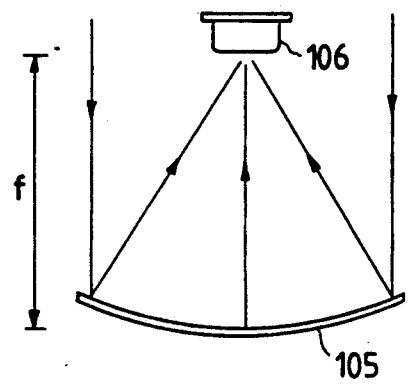
FIG. 10B is an illustration of another conventional light-guiding device.

As described above, according to the first embodiment, although the light-receiving area (L×D) is large, the thickness t of the light-guiding device is extremely small. That is, the thickness t can be set to be extremely smaller (t<<f) as compared with the focal length f of the conventional light-guiding devices illustrated in FIGS. 10A and 10B. Thus, in comparison with the conventional light-guiding devices as illustrated in FIGS. 10A and 10B, under the condition that the light-receiving area is same, the light-guiding device according to this embodiment can considerably reduce the size in the thickness directions. For example, it is possible to provide a sheet-like or plate-like light-guiding device having a thin thickness.

Here, in this embodiment, when the light-receiving area of the light-guiding device is taken to be A, the thickness thereof is taken as t and the volume thereof is $V_H$, the following relation can be obtained:

$$V_H = t \cdot A \alpha A$$

On the other hand, in the convex lens system light-guiding device as illustrated in FIG. 10A, the following relation is obtained:

$$V_L \alpha f \cdot A \alpha A^{3/2}$$

where $V_L$ represents the volume of the conventional light-guiding device and f designates the focal length of the convex lens 100.

This is because, for obtaining the condensing performance irrespective of the area of the convex lens 100, f increases in accordance with increase in A to satisfy the relation of $f \alpha A^{\frac{1}{2}}$.

Accordingly, in the conventional convex lens system or concave mirror system light-guiding device, as the light-receiving area becomes larger, the volume of the device becomes larger to increase the size of the device. On the other hand, according to this embodiment, the volume of the device can be suppressed even if the light-receiving area is large, thereby effectively increasing the light-receiving area.

Further, since in this embodiment the interference fringes on the hologram layer 1 have arc-configurations as indicated by dotted lines in FIG. 2, the respective lights diffracted are directed to the light-receiving element 6 as indicated by arrows in FIG. 2. Thus, the width D4 of the light-receiving element 6 can be set to be considerably shorter than the width D of the substrate 2 and hence it is possible to reduce the dimension of the light-receiving element 6, thereby reducing the dimension of the entire device including the light-receiving element 6. In addition, although the hologram layer 1 is generally has a low durability against humidity, since in this embodiment the hologram layer 1 is interposed between the substrate 2 and the cover 3, most of the hologram layer 1 surface can be protected against the humidity, thereby improving the durability of the hologram layer 1.

Although in this embodiment both the surfaces of the hologram layer 1 are interposed between the substrate 2 and the cover 3, this invention is not limited to this arrangement. For example, in the case that the hologram layer 1 has a relatively large strength, has a high durability, or is used in a gentle condition (in terms of temperature, humidity, ultraviolet or others), it is possible to omit the cover 3. In this case, the light-guiding operation is effected by means of the diffraction and reflection on the hologram layer 1 and the total reflection on the total reflection surface 20 of the substrate 2. Further, for improving the light-receiving efficiency, it is effective to provide a reflection-preventing film on the light-incident surface 2a of the substrate 2. Moreover, it is effective to provide an interference filter for transmitting only light having a specific wavelength. In this case, it is possible to reduce the light to be absorbed by the hologram layer 1 so as not to be diffracted on the hologram layer 1, thereby improving the diffraction efficiency. In addition, although this embodiment is applied to a light-receiving apparatus, this invention is not limited thereto. For example, it is appropriate that the embodiment is applied to a light-emitting apparatus. In this case, one of the above-mentioned light-incident surface 2a and light-outgoing surface 4 is arranged to act as a light-emitting surface. Here, in the case that the light-incident surface 2a of the substrate 2 is used as the light-emitting surface, in place of the light-receiving element 6, an light-emitting element such as a semiconductor laser element and a light-emitting diode is provided at that position.

Figure 12:
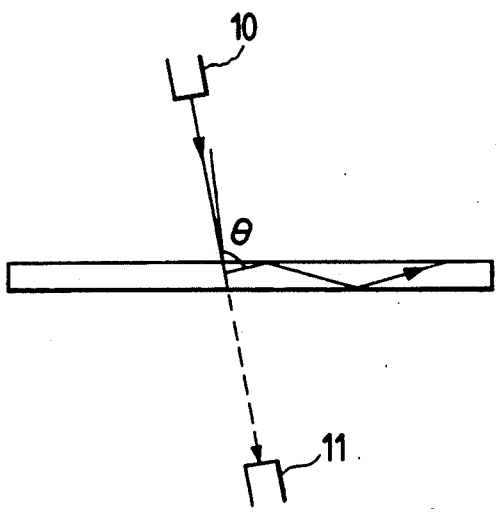
FIG. 12 is an illustration for describing a technique of measuring the diffraction efficiency.

Further, a description will be made hereinbelow in terms of a selection of light for improving the diffraction efficiency. FIG. 12 is an illustration for describing a method of measuring the diffraction efficiency. In FIG. 12, a projector 10 and a light-receiving element 11 are disposed in opposed relation to each other with reference to a total reflection angular hologram 12 and inclined at a predetermined angle. Light from the projector 10 is incident on the total reflection angular hologram 12 to penetrate the total reflection angular hologram 12, and the light passing through the total reflection angular hologram 12 is measured by the light-receiving element 11. Here, as the light-receiving element 12 there is used a spectrophotometer. In the measuring procedure, the reference is taken with a glass having a thickness equal to that of the hologram substrate to measure the transmittance by the light-receiving element 11. The transmittance is the minimum value because the hologram has a wavelength dependency. The diffraction efficiency is obtained on the basis of the measured transmittance in accordance with an equation: 100% − transmittance (%) ≈ diffraction efficiency (%). Here, in the illustration, $\theta$ represents an angle between the light-incident light and reflected light in the hologram 12.

Figure 13:
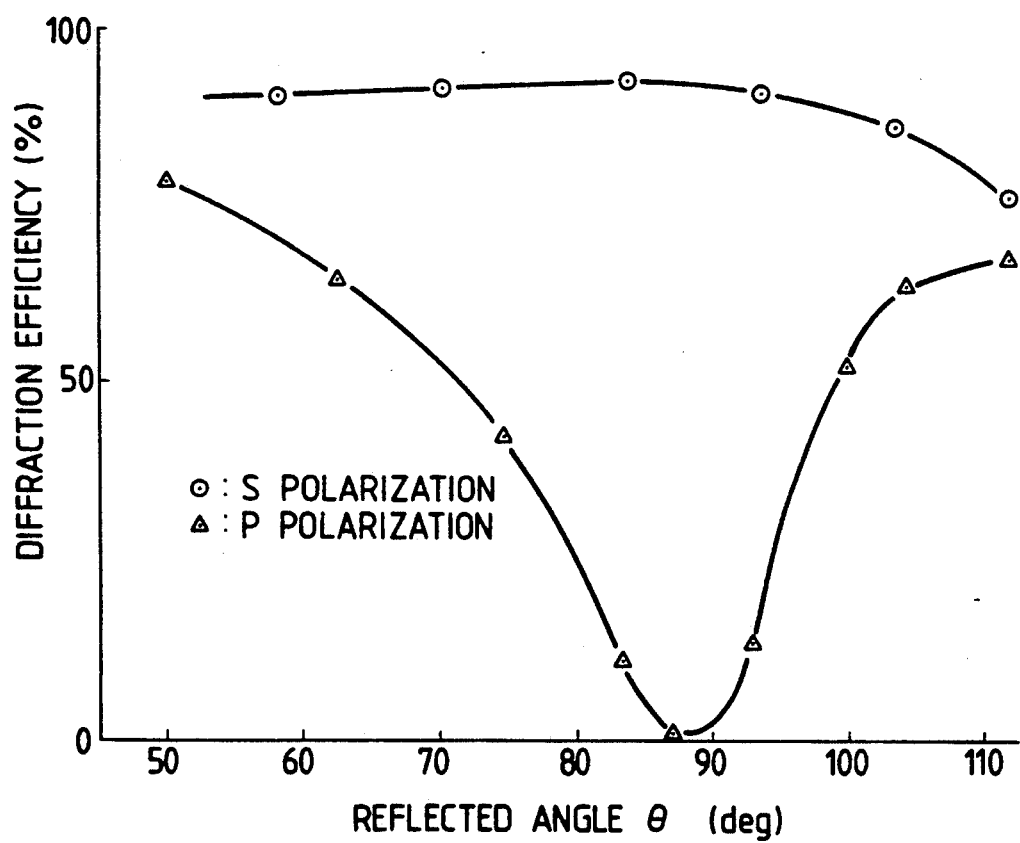
FIG. 13 is a graphic diagram showing the measurement result due to the FIG. 12 technique.

FIG. 13 is a reflected angle-diffraction efficiency characteristic diagram showing this measurement result. As seen from FIG. 13, in terms of the S-polarization light (light polarized in a direction perpendicular to the light-incident surface), a high diffraction efficiency can be obtained irrespective of the angle $\theta$, while in terms of the P-polarization light (light polarized in a direction parallel to the light-incident surface) the efficiency becomes zero at the vicinity of 90°. Thus, for obtaining a high efficiency in using this light-guiding type hologram, it is required to use the S-polarization light or set the angle $\theta$ at a position separated by about ±20° from 90°.

Moreover, a description will be made hereinbelow in terms of the application of the first embodiment of this invention. For example, the light-guiding device according to this embodiment is applicable to a light-receiving apparatus of a laser radar system for measuring a distance between motor vehicles. In this case, laser light is emitted from a semiconductor laser element of one motor vehicle toward the other motor vehicle so that the laser light reflected therefrom is received by the light-incident surface 2a of the substrate to measure the difference in time between the emission and the reception by means of a control unit including the signal processing circuit 62 to measure the distance between the motor vehicles. Accordingly, irrespective of the reproducibility of the holography image, the hologram layer 1 has a light-receiving function only. The light-guiding device according to this embodiment is not only applicable to the light-receiving apparatus but also applicable to a light-emitting apparatus. Thus, the positions at which the light-incident surface and the light-outgoing surface are required to be selected in consideration of whether the light-guiding device is applied to the light-receiving apparatus or the light-emitting apparatus.

Figure 5:
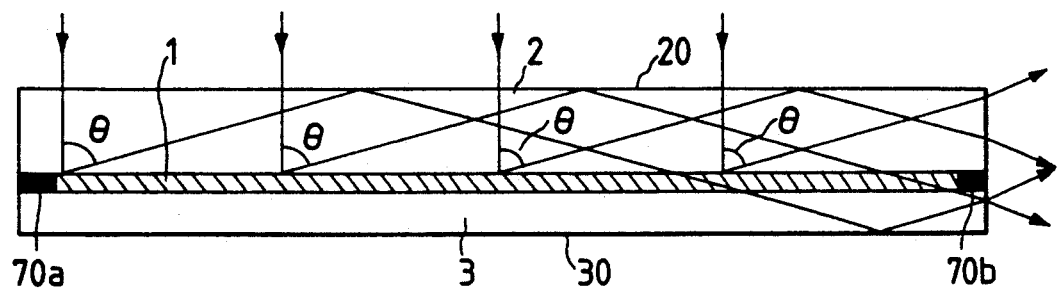
FIG. 5 is a side view showing an arrangement of a light-guiding device according to a second embodiment of this invention.

A second embodiment of this invention will be described hereinbelow with reference to FIG. 5. This second embodiment is for removing a problem that the gelatin dichromate constituting the hologram layer 1 is weak in humidity, that is, the refractive index difference tends to become small due to the humidity. As illustrated in FIG. 5, the length of the hologram layer 1 is arranged to be shorter than the length of the substrate 2 and sealing portions 70a and 70b made of an adhesive material are provided at both sides of the hologram layer 1 in the longitudinal directions. Thus, since the hologram layer 1 which is weak in the humidity is sealed by the sealing portions 70a, 70b in addition to the substrate 2 and the cover 3, it is possible to more effectively protect the hologram layer 1 against the humidity. Here, the adhesive material for the sealing portions 70a and 70b is preferable to have a light-transmitting characteristic and have a refrative index equal to or close to that of the substrate 2 or the cover 3.

Figure 6:
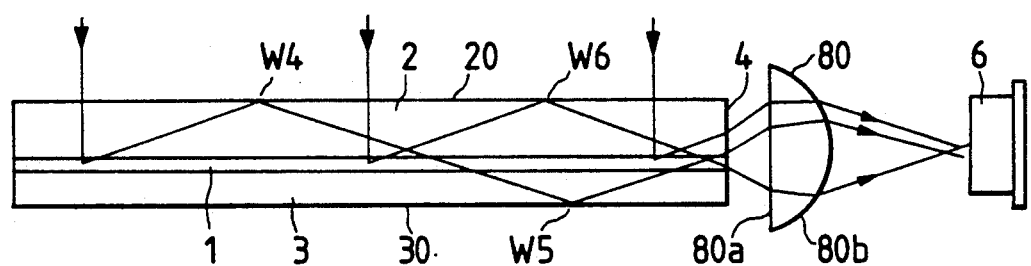
FIG. 6 is a side view showing an arrangement of a light-guiding device according to a third embodiment of the present invention.

FIG. 6 shows a light-guiding device according to a third embodiment of this invention. In this third embodiment, an optical system for condensing light outputted from the light-outgoing surface 4 is provided, thereby achieving the size-reduction of the light-receiving element 6. In FIG. 6, between the light-receiving element 6 and the light-outgoing surface 4 there is provided a light-condensing convex lens 80 having a flat surface 80a and a convex surface 80b. Lights total-reflected on areas W4 and W6 of the substrate 2 and an area W5 of the cover 3 are emitted through the light-outgoing surface 4 and condensed on the light-receiving surface 60 of the light-receiving element 6 through the convex lens 80. Even in the case that it is difficult that the light-receiving element 6 is brought close to the light-outgoing surface 4, this arrangement can condense the light from the light-outgoing surface 4 through the convex lens 80 to cause the light to surely reach the light-receiving surface 60 of the light-receiving element 6, thereby improving the degree of freedom in design of the optical system. Further, since the light is condensed by the convex lens 80, it is possible to reduce the area of the light-receiving surface 60 to achieve the size-reduction of the light-receiving element 6.

Figure 7:
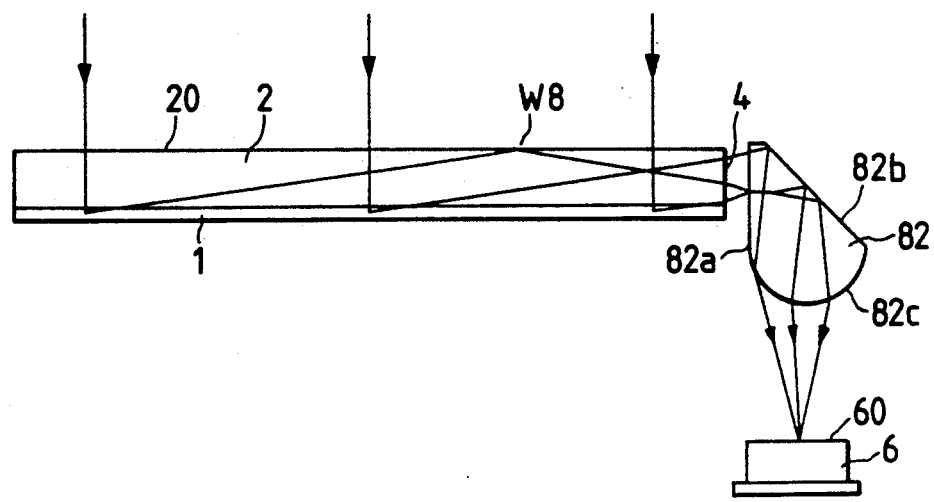
FIG. 7 is a side view showing an arrangement of a light-guiding device according to a fourth embodiment of the present invention.

FIG. 7 shows a light-guiding device according to a fourth embodiment of this invention. As well as the above-described third embodiment, in this fourth embodiment a condensing lens 82 is similarly provided between the light-receiving element 6 and the light-outgoing surface 4 but the cover 3 is not provided. In FIG. 7, the lens 82 is equipped with a flat surface 82a, a reflecting surface 82 and a convex surface 82c. The light total-reflected at an area W8 is emitted from the light-outgoing surface 4 and condensed on the light-receiving surface 60 of the light-receiving element 6 through the lens 82. According to this embodiment, even in the case that it is difficult that the light-receiving element 6 is arranged to approach the light-outgoing surface 4 or that the light-receiving surface 60 is arranged to directly face the light-outgoing surface 4, the light from the light-outgoing surface 4 can be bent and condensed through the lens 82 so as to surely reach the light-receiving surface 60. In addition, it is possible to improve the degree of freedom in design of the optical system.

Figure 8:
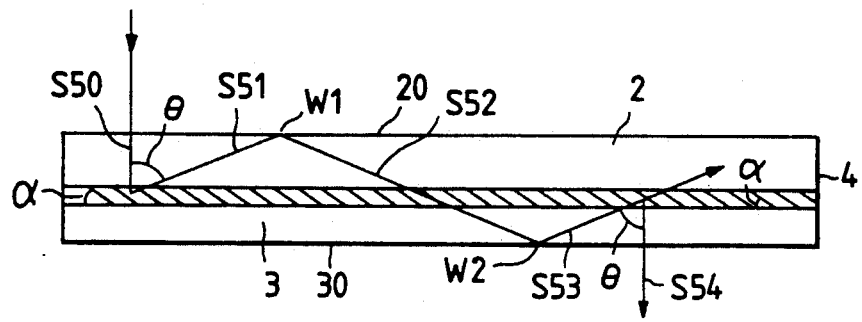
FIG. 8 is an illustration for describing an optical path taken when the total reflection is effected two times.
Figure 9:
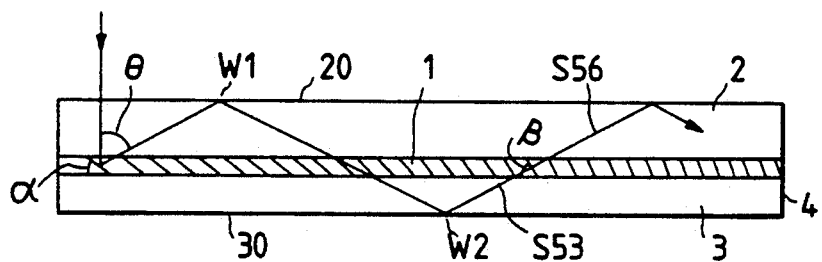
FIG. 9 is a side view showing an arrangement of a light-guiding device according to a fifth embodiment of this invention.

FIG. 9 shows a light-guiding device according to a fifth embodiment of this invention. This fifth embodiment is for resolving the following problem. That is, as illustrated in FIG. 8, when the angles of the interference fringes of the hologram 1 are entirely equal to each other and are $\alpha$, in the case that the length L of the light-guiding device, the light incident along an optical path S50 is diffracted and reflected to advance along an optical path S51 so that a first total reflection is effected at an area W1 of the total reflection surface 20 of the substrate 2 to cause the light to advance along an optical path S52. Thereafter, the light passes through the hologram layer 1 so that a second total reflection is effected at an area W2 of the total reflection surface 30 to cause the light to advance along an optical path S53 to be again incident on the hologram layer 1. At this time, a portion of the light is diffracted and reflected on the hologram layer 1 so as to be outputted through an optical path S54 to the outside of the cover 3.

In order to eliminate this problem, according to the fifth embodiment, as illustrated in FIG. 9, all the angles of the interference fringes of the hologram layer 1 are not arranged to be the same but the angles of the interference fringes existing at the light-outgoing surface 4 side are set to $\beta$. Thus, the light total-reflected at the area W2 to advance along the optical path 53 to be again incident on the hologram layer 1 passes through the hologram layer 1 as it is so as to advance an optical path 56 because of not satisfying the diffracting and reflecting relation, thereby preventing the escape of the light to prevent the lowering of the light-receiving rate. For removing the above-mentioned problem, it is also appropriate that the diffracting and reflecting angle $\theta$ of the hologram layer 1 is enlarged to reduce the number of times of the total reflections so that the light total-reflected two times is not incident on the hologram layer 1.

Figure 11:
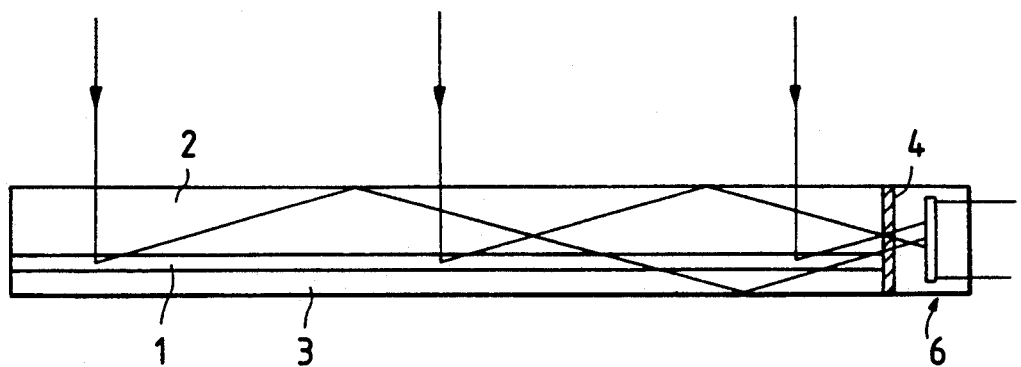
FIG. 11 is a side view showing an arrangement of a light-guiding device according to a sixth embodiment of this invention.

Still further, FIG. 11 shows a light-guiding device according to a sixth embodiment of this invention. This sixth embodiment is for reducing the loss of the light to be outgone from the outgoing surface 4. That is, as illustrated in FIG. 11, the light-receiving element (a resin-molded sensor) 6 is directly pasted with the light-outgoing surface 4. With this arrangement, the space (air layer) between the light-outgoing surface 4 and the light-receiving element 6 can be removed so as to suppress the loss of the light as much as possible.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A light guiding device comprising:
   a light incident surface for receiving incoming light which advances along an optical path, the incoming light-incident on said light-incident surface being an S-polarization light whose polarization direction is perpendicular to said light-incident surface;
   a hologram layer having two opposed longitudinal surfaces, said hologram layer having an interference pattern which acts as a diffraction grating to diffract and reflect the incoming light which has advanced through said light incident surface, said hologram layer diffracting and reflecting the light so that the diffracted and reflected light advances along a different optical path in a specific direction; and
   a total reflection layer having a total reflection surface disposed in opposed relation to at least one of said longitudinal surfaces of said hologram layer so that the light diffracted and reflected by said hologram layer is incident on said total reflection surface at an angle larger than a critical angle so as to allow said total reflective surface to reflect the diffracted and reflected light.

2. A device as claimed in claim 1, wherein said hologram layer has a portion that is partially exposed to the atmosphere.

3. A device as claimed in claim 2, further comprising a sealing member provided at said portion where said hologram layer is exposed to the atmosphere so that said hologram layer is protected against moisture in the atmosphere.

4. A device as claimed in claim 1, further comprising an optical system for condensing the outgoing from said light-outgoing surface and photoelectric converting means for receiving the light condensed by said optical system to generate an electric signal corresponding to a quantity of the received light.

5. A device as claimed in claim 1, further comprising photoelectric converting means disposed in opposed relation to said light-outgoing surface, said photoelectric converting means receiving the outgoing light from said outgoing surface to generate an electric signal corresponding to a quantity of the received light.

6. A light guiding device comprising:
a light incident surface for receiving incoming light which advances along an optical path, the incident light being a P-polarization light having a polarizing direction parallel to the incident surface;
a hologram layer having two opposed longitudinal surfaces, said hologram layer having an interference pattern which acts as a diffraction grating to diffract and reflect the incoming light which has advanced through said light incident surface, said hologram layer diffracting and reflecting the light so that the diffracted and reflected light advances along a different optical path in a specific direction, a diffracting angle of said hologram layer being arranged such that the diffracted light is not diffracted in the vicinity of 90° relative to said diffracting angle; and
a total reflection layer having a total reflection surface disposed in opposed relation to at least one of said longitudinal surfaces of said hologram layer so that the light diffracted and reflected by said hologram layer is incident on said total reflection surface at an angle larger than a critical angle so as to allow said total reflective surface to reflect the diffracted and reflected light.

7. A device as claimed in claim 6, wherein the incident light is a random polarization light whose polarizing direction is random.

8. A device as claimed in claim 6, wherein said hologram layer has a portion that is partially exposed to the atmosphere.

9. A device as claimed in claim 8, further comprising a sealing member provided at said portion where said hologram layer is in contact with air so that said hologram layer is protected against moisture with the atmosphere.

10. A device as claimed in claim 6, further comprising an optical system for condensing the light from said light-outgoing surface and photoelectric converting means for receiving the light condensed by said optical system to generate an electric signal corresponding to a quantity of the received light.

11. A device as claimed in claim 6, further comprising photoelectric converting means disposed in opposed relation to said light-outgoing surface, said photoelectric converting means receiving the light from said outgoing surface to generate an electric signal corresponding to a quantity of the receiving light.

12. A light-guiding device having a light-incident surface and a light-outgoing surface for guiding light incident from said light-incident surface to said light-outgoing surface toward a light-receiving surface of a photoelectric converting means for generating an electric signal corresponding to a quantity of the received light, said device comprising:
a hologram layer having two opposed longitudinal surfaces, said hologram layer having an interference pattern which acts as a diffraction grating to diffract and reflect the light which has advanced through said light-incident surface, said hologram layer diffracting and reflecting the light so that the diffracted and reflected light advances in a predetermined direction;
a first total reflection layer having a first total reflection surface disposed in opposed relation to one of said longitudinal surfaces of said hologram layer so that the light diffracted and reflected by said hologram layer is incident on said first total reflection surface at a predetermined angle so as to be total-reflected thereon; and
a second total reflection layer having a second total reflection surface disposed in opposed relation to the other longitudinal surface of said hologram layer so that the incident light passing through said hologram layer is incident on said second total reflection surface at a predetermined angle so as to be total-reflected thereon.

13. A device as claimed in claim 12, wherein said first total reflection surface of said first total reflection layer acts as said light-incident surface of said device.

14. A device as claimed in claim 12, wherein a longitudinal length of said hologram layer is shorter than longitudinal lengths of said first and second total reflection layers so that spaces are formed between said first and second total reflection layers at end portions of said device.

15. A device as claimed in claim 14, further comprising a plurality of sealing members for filling said spaces between said first and second total reflection layers so that the hologram layer is protected against moisture in the atmosphere.

16. A device as claimed in claim 12, further comprising an optical system provided between said light-outgoing surface and said photoelectric converting means, said optical system condensing the outgoing light from said light-outgoing surface into said photoelectric converting means.

17. A device as claimed in claim 12, wherein a diffracting angle of said hologram layer being arranged such that the diffracted light is not diffracted in the vicinity of 90° relative to said diffracting angle, the incident light being a P-polarization light having a polarizing direction parallel to the incident surface.

18. A device as claimed in claim 17, wherein the incident light is a random polarization light whose polarizing direction is random.

19. A device as claimed in claim 12, wherein said interference pattern of said hologram layer includes a plurality of interference fringes, said interference fringe positioned closest to said light-outgoing surface having a different angle as compared to the other interference fringes.

20. A device as claimed in claim 12, wherein said photoelectric converting means is directly pasted with said light-outgoing surface.

* * * * *